(12) United States Patent
Labbe et al.

(10) Patent No.: US 12,130,231 B2
(45) Date of Patent: Oct. 29, 2024

(54) MEASURE OF THE DEGREE OF CRYSTALLINTY OF A POLYMER COATING ON A METAL SUBSTRATE

(71) Applicant: ArcelorMittal, Luxembourg (LU)

(72) Inventors: Nathalie Labbe, Jury (FR); Morgan Ferte, Jury (FR)

(73) Assignee: ArcelorMittal, Luxembourg (LU)

( * ) Notice: Subject to any disclaimer, the term of this patent is extended or adjusted under 35 U.S.C. 154(b) by 387 days.

(21) Appl. No.: 17/413,820

(22) PCT Filed: Nov. 28, 2019

(86) PCT No.: PCT/IB2019/060277
§ 371 (c)(1),
(2) Date: Jun. 14, 2021

(87) PCT Pub. No.: WO2020/128687
PCT Pub. Date: Jun. 25, 2020

(65) Prior Publication Data
US 2022/0018767 A1    Jan. 20, 2022

(30) Foreign Application Priority Data

Dec. 20, 2018  (WO) ................. PCT/IB2018/060438

(51) Int. Cl.
*G01N 21/55*    (2014.01)
*G01N 21/3563*  (2014.01)
(Continued)

(52) U.S. Cl.
CPC ......... *G01N 21/55* (2013.01); *G01N 21/3563* (2013.01); *G01N 21/8422* (2013.01);
(Continued)

(58) Field of Classification Search
CPC ............... G01N 21/55; G01N 21/3563; G01N 21/8422; G01N 21/8901; G01N 2021/177;
(Continued)

(56) References Cited

U.S. PATENT DOCUMENTS 4,254,337 A  *  3/1981  Yasujima ............... G01B 11/06
                                                  356/504
7,349,103 B1 *  3/2008  Balooch .................... G01J 3/10
                                                  356/601
(Continued)

FOREIGN PATENT DOCUMENTS

JP    H08313347 A    11/1996
JP    H10251613 A    9/1998
(Continued)

OTHER PUBLICATIONS

See Search Report of PCT/IB2018/060031 dated Dec. 4, 2019.
(Continued)

*Primary Examiner* — Mohamed K Amara
(74) *Attorney, Agent, or Firm* — Davidson Kappel LLC (57) ABSTRACT

A method and a measuring equipment of the degree of crystallinity of a polymer coating on a metallic substrate using a hyperspectral camera as well as representing or mapping the degree of crystallinity is provided. An equipment for online measurement of crystallinity of polymers, including at least one hyperspectral camera, at least one lighting source, a polymer layer deposited on a substrate and means to convey the substrate, the lighting source and the hyperspectral camera being set-up in specular reflection towards the polymer layer.

23 Claims, 4 Drawing Sheets

(51) Int. Cl.
*G01N 21/84* (2006.01)
*G01N 21/89* (2006.01)
*G01N 21/17* (2006.01)

(52) U.S. Cl.
CPC ... *G01N 21/8901* (2013.01); *G01N 2021/177* (2013.01); *G01N 2021/8427* (2013.01)

(58) Field of Classification Search
CPC ....... G01N 2021/8427; G01N 21/8903; G01N 2021/933
See application file for complete search history.

(56) References Cited

U.S. PATENT DOCUMENTS

| | | | |
|---|---|---|---|
| 2019/0353590 A1 | | 11/2019 | Ribes Cortes et al. |
| 2022/0018767 A1 | * | 1/2022 | Labbe ................ G01N 21/8422 |

FOREIGN PATENT DOCUMENTS

| | | | | | |
|---|---|---|---|---|---|
| JP | H11254590 A | | 9/1999 | | |
| JP | 2004513509 A | * | 4/2004 | ............. | H01L 21/02 |
| JP | 2006106006 A | * | 4/2006 | ................ | G01J 3/02 |
| KR | 20230072592 A | * | 5/2023 | ......... | G01N 21/3563 |
| WO | WO 2015195746 A1 | | 12/2015 | | |
| WO | WO2018091631 A1 | | 5/2018 | | |

OTHER PUBLICATIONS

Ryan Gosselin et al, "On-line prediction of crystallinity spatial distribution across polymer films using NIR spectral imaging and chemometrics methods", Canadian Journal of Chemical Engineering, US, CA, (Sep. 27, 2008), vol. 86, No. 5, Sep. 27, 2008, pp. 869-878.

Bunding Lee K A, "Comparison of MID-IR With NIR in Polymer Analysis", Applied Spectroscopy Reviews, Marcel Dekker Inc.270 Madison Avenue. New York, US, (Sep. 1, 1993), vol. 28, No. 3, Sep. 1, 1993, pp. 231-284.

Ferte M et al, "On-line detection of oil on steel coils and thickness measurement using hyperspectral camera", 2014 6th Workshop on Hyperspectral Image and Signal Processing: Evolution in Remote Sensing (Whispers), IEEE, (Jun. 24, 2014), Jun. 24, 2014, pp. 1 to 4.

Mukherjee Sindhuraj et al, "A review of recent trends in polymer characterization using non-destructive vibrational spectroscopic modalities and chemical imaging", Analytica Chimica Acta, Elsevier, Amsterdam, NL, (Sep. 11, 2015), vol. 895, Sep. 11, 2015, pp. 12 to 34.

* cited by examiner

MEASURE OF THE DEGREE OF CRYSTALLINTY OF A POLYMER COATING ON A METAL SUBSTRATE

The present invention relates to a method and a measuring equipment of the degree of crystallinity of a polymer coating on a metallic substrate as well as representing or mapping said degree of crystallinity.

Applying a coating on a metal substrate enhances its properties such as corrosion resistance. Polymer coating films are usually laminated on a metal substrate then heated and eventually quenched. This quench, depending on the cooling speed applied, may hinder the formation of crystalline phase within the polymer, that will be partly in an amorphous state. The degree of crystallinity of the coating, which represents the proportion of polymer with a crystalline structure, influences greatly its properties. Thus, it is essential to assess the degree of crystallinity of such coatings to assure that the desired properties, requirements and specifications are met.

BACKGROUND

In the state of the art, the degree of crystallinity of a polymer coating on a metallic substrate is predominantly measured non-destructively using the Raman spectroscopy. This method is negatively impacted by some measurement conditions such as humidity, the chattering of the substrate, the medium between the substrate and the lighting or measuring devices, a variation in the distance between the sample and the measuring or lighting devices. Moreover, the lighting source used during Raman spectroscopy generally heats the coating and degrades it, favoring the formation of crystalline phase. Furthermore, any light other than the lighting source impacts negatively the measurement precision. Consequently, the measured area needs to be protected from natural and exterior lights which is a major drawback for its industrial use.

Other techniques such as DRX or infrared spectroscopy can measure the degree of crystallinity of polymers but they are not applied on polymer coatings on a metallic substrate.

Figure 1:
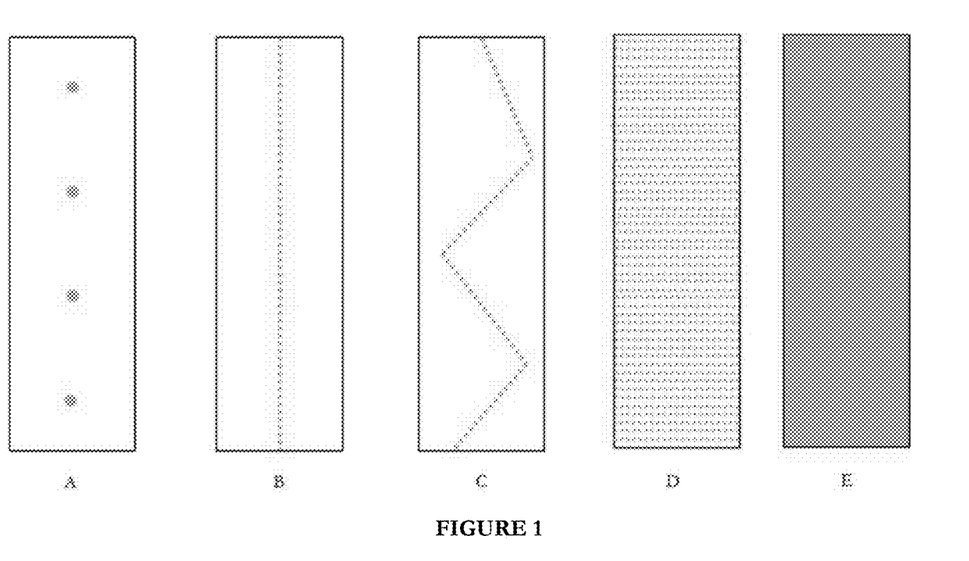
FIG. 1 is a schematic representation of the measured area by the different techniques, A) Raman spectroscopy: A); Infrared: B) and C); the invention D) and E).

Besides, using the methods and equipment described in the state of the art, it is only possible to determine the crystallinity degree of a single spot along the substrate coating width. Depending on the technique used, those single spots are more or less spaced in function of the acquisition time, (from at least a dozen of seconds for the Raman spectroscopy to a fraction of second for the infrared spectroscopy) and the substrate speed. FIG. 1 schematically illustrates the space between two consecutive measured spots depending on the measurement techniques (A: Raman spectroscopy, B and C: infrared spectroscopy, D and E: the present invention), each spot represents a measured spot.

SUMMARY OF THE INVENTION

It is an object of the present invention to provide a method to measure and represent the degree of crystallinity of a polymer coating, on the full width of such coating deposited on a metallic substrate, without degrading said coating and with a good precision of the measurement.

The present invention provides a process for mapping the crystallinity degree of a polymer coating (1) of a moving metallic substrate (2), the process comprising the following steps:

a) lighting a transversal area of said of said polymer coating (1) encompassing its full width W, with a polychromatic light including wavelengths in the infrared domain, b) measuring with at least one hyperspectral camera (3), the light intensity $S_{impacted,\lambda\alpha}$ at a predetermined wavelength $\lambda\alpha$ impacted by the degree of crystallinity of said coating in the infrared domain and
the light intensity $S_{stable,\lambda\beta}$ at a predetermined wavelength $\lambda\beta$ not impacted by the degree of crystallinity of said coating in the infrared domain
of at least two light beams (B1, B2) from said polychromatic light after reflection on said moving metallic substrate (2) on two different locations (L1, L2) within said transversal area, c) determining at least an impacted absorbance $\lambda_{imp}$, using said light intensity $S_{impacted,\lambda\alpha}$ at said predetermined wavelength $\lambda\alpha$ impacted by the degree of crystallinity for each beam (B1, B2), d) determining at least a stable absorbance $\lambda_{sta}$, using said light intensity $S_{stable,\lambda\beta}$ at said predetermined wavelength $\lambda\beta$ not impacted by the degree of crystallinity for each beam (B1, B2), e) determining, for each beam (B1, B2), a ratio, R, equals to $\lambda_{imp}/A_{sta}$ f) converting each ratio R to a degree of crystallinity, g) mapping the degree of crystallinity of said polymer coating in said transversal area using said degree of crystallinity and said locations (L1, L2).

The present invention also provides an equipment (6) for online measurement of crystallinity degree of polymer coatings on a metallic substrate, comprising, at least one hyperspectral camera (3), at least one polychromatic light emitter (4), and means to convey said substrate, the polychromatic light emitter (4) and the hyperspectral camera (3) being set-up in specular reflection towards said substrate.

Other characteristics and advantages of the invention will become apparent from the following detailed description of the invention.

BRIEF DESCRIPTION OF THE DRAWINGS

To illustrate the invention, various embodiments will be described, particularly with reference to the following figure.

DETAILED DESCRIPTION

The invention relates to a process for mapping the crystallinity of a polymer coating 1 on a moving metallic substrate 2, the process repeating the following steps:
  a) lighting a transversal area of said polymer coating 1 encompassing its full width W, with a polychromatic light including wavelengths in the infrared domain,
  b) measuring with at least one hyperspectral camera 3,
    the light intensity $S_{impacted,\lambda\alpha}$ at a predetermined wavelength $\lambda\alpha$ impacted by the degree of crystallinity of said coating in the infrared domain and
    the light intensity $S_{stable,\lambda\beta}$ at a predetermined wavelength $\lambda\beta$ not impacted by the degree of crystallinity of said coating in the infrared domain of at least two light beams (B1, B2) from said polychromatic light after reflection on said moving metallic substrate 2 on two different locations (L1, L2) within said transversal area,
  c) determining at least an impacted absorbance $\lambda_{imp}$, using said light intensity $S_{impacted,\lambda\alpha}$ at said predetermined wavelength $\lambda\alpha$ impacted by the degree of crystallinity for each beam (B1, B2),
  d) determining at least a stable absorbance $A_{sta}$, using said light intensity $S_{stable,\lambda\beta}$ at said predetermined wavelength $\lambda\beta$ not impacted by the degree of crystallinity for each beam (B1, B2),
  e) determining, for each beam (B1, B2), a ratio, R, equals to $A_{imp}/A_{sta}$
  f) converting each ratio R to a degree of crystallinity,
  g) mapping the degree of crystallinity of said polymer coating in said transversal area using said degree of crystallinity and said locations (L1, L2).

Figure 2:
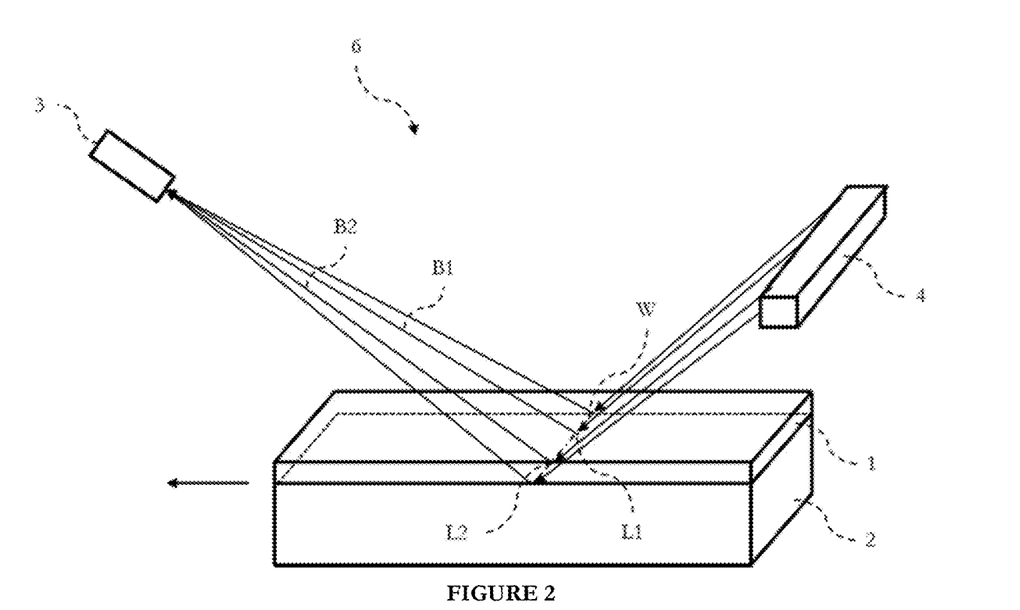
FIG. 2 is a schematic representation of a first embodiment of a measuring equipment.

On the figures, only the light beams emitted by the polychromatic light emitter 4, reflected on the moving substrate and measured by the hyperspectral camera are represented. As illustrated in FIG. 2, a polymer coating 1 deposited on a moving metallic substrate 2 is lighted at least in the infrared domain, from 700 nm to 0.1 mm, with a polychromatic light that can come from a polychromatic light emitter 4. The lighting is done in a way that a transversal zone encompassing the full width W of said polymer coating 1 is lighted.

Then a hyperspectral camera 3 measures the light intensity $S_{impacted,\lambda\alpha}$ at a predetermined wavelength $\lambda_\alpha$ in the infrared domain, that is impacted by the degree of crystallinity, as explained later. The measurement is done for at least two beams, e.g. B1 and B2, from the polychromatic light emitter 4 reflected by said moving metallic substrate 2 on at least two locations, e.g. L1 and L2. The locations are defined by the camera.

Then the hyperspectral camera 3 measures also the light intensity $S_{stable,\lambda\beta}$ at a predetermined wavelength $\lambda\beta$, in the infrared domain, not impacted by the degree of crystallinity. The measure is done for at least two beams, e.g. B1 and B2, from the polychromatic light emitter 4 reflected by said moving metallic substrate 2 on at least two locations, e.g. L1 and L2. The locations are defined by the camera.

Figure 3:
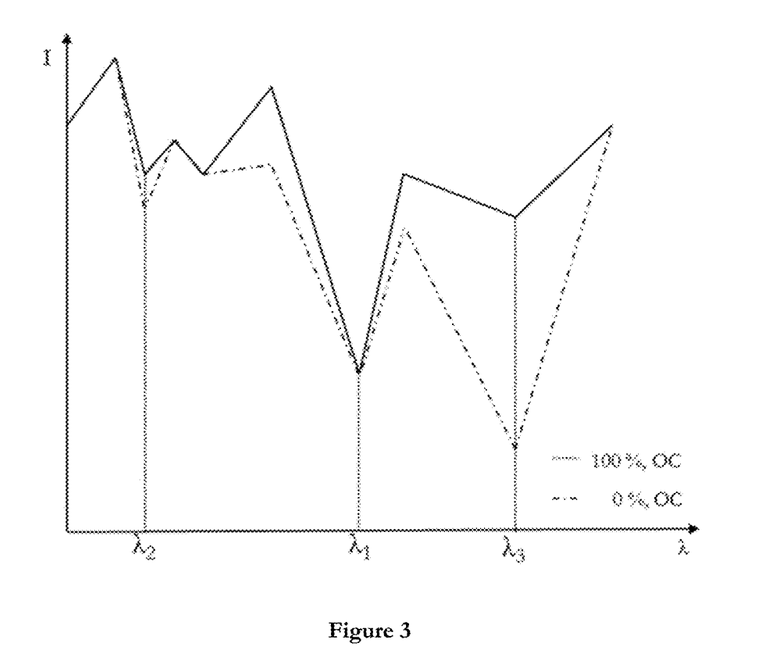
FIG. 3 is a schematic representation of the intensity curves in function of the wavelength for two different coatings, one being 100% crystalline and the other being 100% amorphous.

As illustrated in FIG. 3, in the frame of the present invention, a wavelength is affected by the degree of crystallinity when the intensity variation at this wavelength is superior or equal to 7% between a 100% crystalline coating and a 100% amorphous coating. A wavelength is not affected by the degree of crystallinity when the intensity variation at this wavelength is inferior to 7% between a 100% crystalline coating and a 100% amorphous coating.

FIG. 3 exhibits two spectrums, one of a fully crystalline coating in optimal measurement condition (continuous line), one of a fully amorphous coating in optimal measurement condition (dot+dash). In the frame of the present invention, optimal condition means that the measurement is done on a metallic substrate without any polymer coating on it. Three wavelengths are noted ($\lambda_1$, $\lambda_2$ and $\lambda_3$). The wavelength $\lambda_1$ is considered as unaffected by the degree of crystallinity because its intensity is the same for the fully crystalline coating and for the fully amorphous coating. The wavelength $\lambda_2$ is also considered as unaffected by the degree of crystallinity as its wavelength intensity difference between the fully crystalline coating and the fully amorphous coating is smaller than 7%. The wavelength $\lambda_3$ is considered as affected by the degree of crystallinity as the wavelength intensity difference is bigger than 7%.

Then, for each beam, at least an impacted absorbance is determined using said intensity $S_{impacted,\lambda\alpha}$ at the wavelength $\lambda_\alpha$, impacted by the degree of crystallinity. The higher the intensity variation at a wavelength due to the degree of crystallinity, the more interesting it is to use such a wavelength for determining an impacted absorbance because the measurement will be more precise.

The impacted absorbance can be calculated, for example, using the following equation:

$$A_{imp}=[(S_{impacted,\lambda\alpha}-D_{\lambda\alpha})],$$

where:
  $S_{impacted,\lambda\alpha}$ is the wavelength intensity impacted by the degree of crystallinity of the collected polychromatic light for a determined wavelength $\lambda_\alpha$,
  $D_{\lambda\alpha}$ is the acquisition of the dark and represents the background noise for a determined wavelength $\lambda_1$. The dark corresponds to the noise, it is influenced by the camera temperature. Said dark is preferentially measured. It can be measured before the measurement or at regular time with an automatic shutter in the camera.

In the case where several impacted absorbances are determined for a same location along the coating width, a representative value, $V_{S_{impacted}}$, of them is determined. Preferably, the representative value can be the mean or the median of all the absorbances not impacted by the degree of crystallinity.

Then, for each beam, at least a stable absorbance is determined using said intensity $S_{stable,\lambda\beta}$ at the wavelength $\lambda\beta$ not impacted by the degree of crystallinity. The lower the intensity variation at a wavelength due to the degree of crystallinity, the more interesting it is to use such a wavelength for determining an absorbance not impacted by the degree of crystallinity.

The stable absorbance can be calculated, for example, using the following equation:

$$A_{sta}=[(S_{stable,\lambda\beta}-D_{\lambda\beta})],$$

where:
  $S_{stable,\lambda\beta}$ is the wavelength intensity impacted by the degree of crystallinity of the collected polychromatic light for a determined wavelength $\lambda\beta$,
  $D_{\lambda\beta}$ is the acquisition of the dark and represents the background noise for a determined wavelength $\lambda\beta$. The dark corresponds to the noise, it is influenced by the camera temperature. It can be measured before the measurement or at regular time with an automatic shutter in the camera.

In the case where several stable absorbances are determined for a same location along the coating width, a representative value, $V_{S_{stable}}$, of them is determined. Preferably, the representative value can be the mean or the median of all the absorbances not impacted by the degree of crystallinity.

Then, for each beam, a ratio R between the absorbance impacted by the degree of crystallinity and the absorbance not impacted by the degree of crystallinity is determined.

$$R=[S_{impacted,\lambda\alpha}/S_{stable,\lambda\beta}]$$

In the case where representative values of the absorbance impacted by the degree of crystallinity and the absorbance not impacted by the degree of crystallinity are determined, the following ratio RV is calculated:

$$RV=[V_{S_{impacted}}/V_{S_{stable}}]$$

Each ratio R or RV is linked to a degree of crystallinity.

In another embodiment, the impacted absorbance can be, for example, determined using the following equation:

$$A_{imp2}=[(S_{impacted,\lambda\alpha}-D_{\lambda\alpha})/(R_{i,\lambda\alpha}-D_{\lambda\alpha})],$$

where:
$S_{impacted,\lambda\alpha}$ is the wavelength intensity impacted by the degree of crystallinity of the collected polychromatic light for a determined wavelength $\lambda_\alpha$,
$R_{i,\lambda\alpha}$ is the wavelength intensity of the collected polychromatic light for a determined wavelength $\lambda_\alpha$ in optimal condition for a metallic substrate without coating on it
$D_{\lambda\alpha}$ is the acquisition of the dark and represents the background noise for a determined wavelength $\lambda_1$. The dark corresponds to the noise, it is influenced by the camera temperature. Said dark is preferentially measured. It can be measured before the measurement or at regular time with an automatic shutter in the camera.

In another embodiment, the stable absorbance can be, for example, determined using the following equation $$A_{sta2}=[(S_{stable,\lambda\beta}-D_{\lambda\beta})/(R_{i,\lambda\beta}-D_{\lambda\beta})],$$

where:
$S_{stable,\lambda\beta}$ is the wavelength intensity impacted by the degree of crystallinity of the collected polychromatic light for a determined wavelength $\lambda\beta$,
$R_{i,\lambda\beta}$ is the wavelength intensity of the collected polychromatic light for a determined wavelength $\lambda_\beta$ in optimal condition for a steel without coating on the surface
$D_{\lambda\beta}$ is the acquisition of the dark and represents the background noise for a determined wavelength $\lambda\beta$. The dark corresponds to the noise, it is influenced by the camera temperature. It can be measured before the measurement or at regular time with an automatic shutter in the camera.

Figure 4:
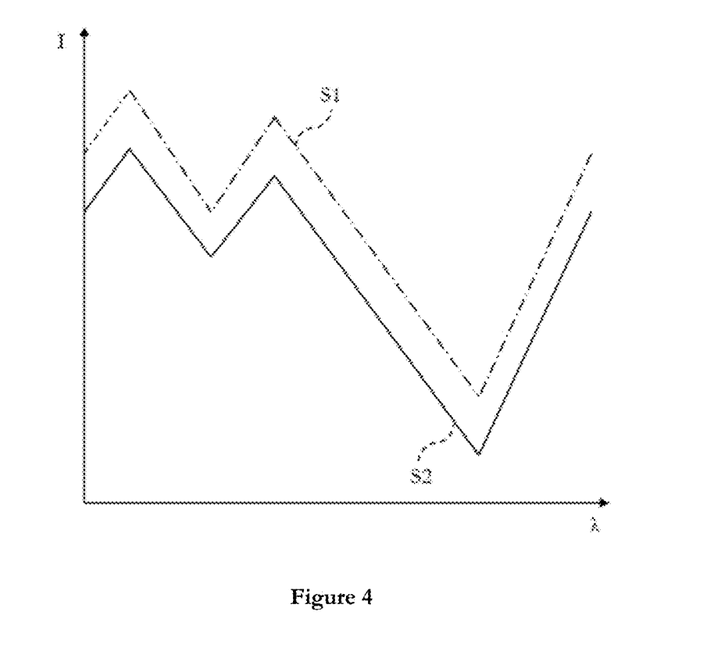
FIG. 4 is a schematic representation of the intensity curves in function of the wavelength for two different measurement conditions.

FIG. 4 exhibits two spectrums, one of a fully crystalline coating measured in optimal measurement condition (S1), one of a fully crystalline coating measured in industrial measurement condition (S2) where the measurement conditions are degraded. Due to the different measurement condition, the industrial spectrum can be shifted towards lower or higher value. That is why a ratio of the absorbance calculated above, $A_{imp2}$ and $A_{sta2}$, is preferably used to lower the impact of the measurement condition on the degree of crystallinity.

Then the degree of crystallinity of each beam, or location, is estimated by converting the ratio previously determined into a degree of crystallinity.

Figure 6:
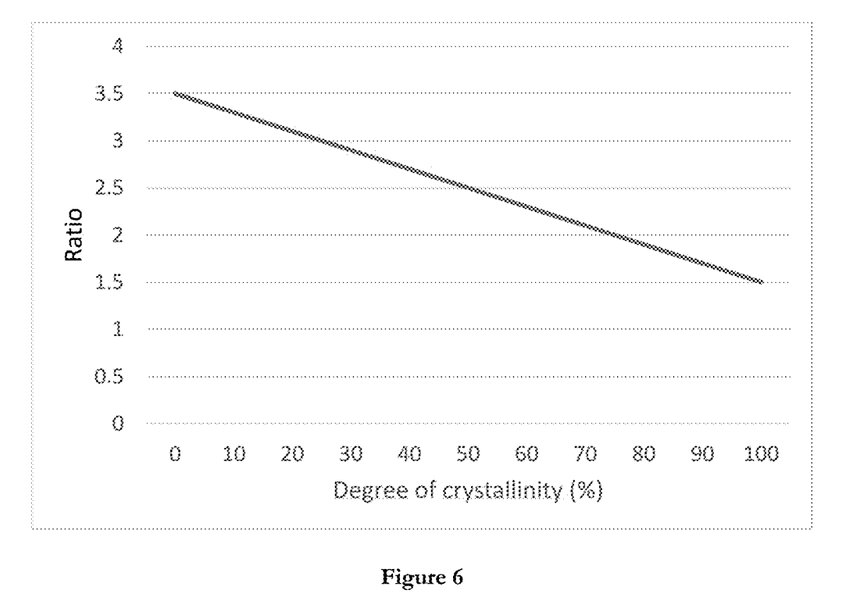
FIG. 6 is an abacus, i.e. a chart, linking the calculated ratio with the degree of crystallinity for an incident angle of 45° for a PET coating.

Advantageously, as illustrated in FIG. 6, said ratio is converted to a degree of crystallinity using abacus. Preferably, the correlation of the abacus between the absorbance and the degree of crystallinity has been confirmed by other measurement method such as DRX, DSC or infrared spectroscopy, beforehand.

A map or a visual representation of the coating degree of crystallinity is made using said previously determined degree of crystallinity and their associated location.

Because all the previously described steps are repeated and the metallic substrate is moving, the degree of crystallinity along the length of the coating polymer can be estimated. The resolution, number of measured spots in a defined area, in the length direction depends on the metallic substrate speed and the acquisition time of the hyperspectral camera. The lower the speed and the lower the acquisition time, the higher the resolution will be.

With the method according to the present invention, the degree of crystallinity of the full width of a polymer coating deposited on a metallic substrate can be measured and represented. Moreover, the degree of crystallinity is not influenced by the operating conditions, such as the chattering of the substrate and humidity, nor is the coating degraded by the lighting source. Furthermore, as illustrated in FIG. 1, the resolution of the degree of crystallinity mapping is more precise compared to the state of the art techniques.

Advantageously, said method is repeated regularly so as to cover the full coating surface of said substrate. Preferably, the steps of the method are repeated as often as possible in order to obtain a degree of crystallinity map as precise as it can be.

Advantageously, said polymer coating is made of polyethylene terephthalate (PET).

Advantageously, said metallic substrate is made of steel. Such a substrate improves the measurement quality due to its low rugosity.

Advantageously, $\lambda\alpha$ is comprised between 8 and 12 micrometres. In an even preferred embodiment, $\lambda\alpha$ is comprised between 10.3 and 10.7 micrometres.

Apparently, some waves in those ranges are more impacted by the degree of crystallinity than in other ranges. Consequently, measuring the intensity of rays having such wavelengths enables a better estimation of the polymers degree of crystallinity.

Advantageously, said at least one hyperspectral camera measures the intensity of at least a wavelength comprised between 9.5 and 9.7 micrometres having its wavelength intensity not impacted by the degree of crystallinity. Using this range enables to have one of the most unaffected intensity by the crystallinity degree. In other words, the variation intensity in function of the crystallinity degree is almost inexistent which permits to establish a good reference independently of the measurement condition.

Advantageously, the step b) is done on at least 30 locations within said transversal area. Doing the measures on at least 30 locations along the coating width increases the resolution of the crystallinity degree map. Thus, the probability to detect a default, where the crystallinity is different than the desired one is higher.

The invention also relates to an equipment 6 for online measurement of crystallinity degree of polymer coatings on a metallic substrate, comprising,
at least one hyperspectral camera 3,
at least one polychromatic light emitter 4,
and means to convey said substrate,
the polychromatic light emitter 4 and the hyperspectral camera 3 being set-up in specular reflection towards said substrate.

As illustrated in FIG. 2, a polymer layer deposited on a substrate is conveyed, by conveying means such as rolls 5.

The measurement equipment, composed of at least a lighting source 2 and at least one hyperspectral camera 1, is positioned above said polymer layer deposited on a substrate and means to convey said substrate (not represented). Said hyperspectral camera can record a spectrum of wavelength intensity for each pixel and is oriented in order to record the beams reflected on the polymer layer deposited on a substrate from the lighting source.

Figure 5:
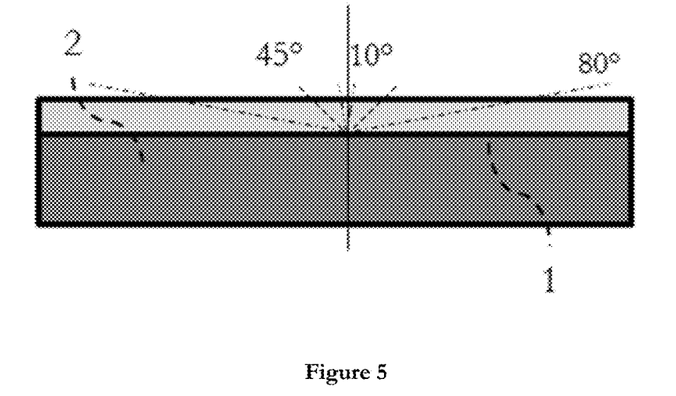
FIG. 5 is a schematic representation of the distance travelled through the coating layer by a beam in function of the incident angle.

Advantageously, said hyperspectral camera 3 is oriented to make an angle comprised between 30° and 60°, preferentially between 40° and 50° and more preferably 45° with the metallic substrate. On one hand, as illustrated in FIG. 5 by the 10° beam, smaller is the measurement angle, shorter is the distance passed by the beam through the coating and thus smaller is the intensity variation detected. On the other hand, as illustrated in FIG. 5 by the 80° beam, higher is the measurement angle, longer it the distance passed by the beam through the coating and thus more sensible is the intensity variation detected to the substrate vibrations. Consequently, closer is the angle to 45°, better is the compromise between a sufficient intensity variation and a small vibration perturbation.

Advantageously, said polychromatic light emitter 4 is an infrared lighting source. Contrary to a LASER, an infrared lighting source is less prone to damage the coating because the power used is generally about 1 000 to 100 000 times lower than for the LASER lighting sources.

Advantageously, said polychromatic light emitter 4 is a made of at least a metal or ceramic. Preferentially, the lighting source is a heated nickel chrome rod or a heated ceramic plate heated. Such a heating enables a higher emission of light in the infrared domain in which there are absorbance affected and unaffected by the degree of crystallinity. Depending on the heating temperature, the intensity of the emitted wavelengths varies. Preferably, said bar or ceramic are heated between 600° C. and 800° C.

Figure 7:
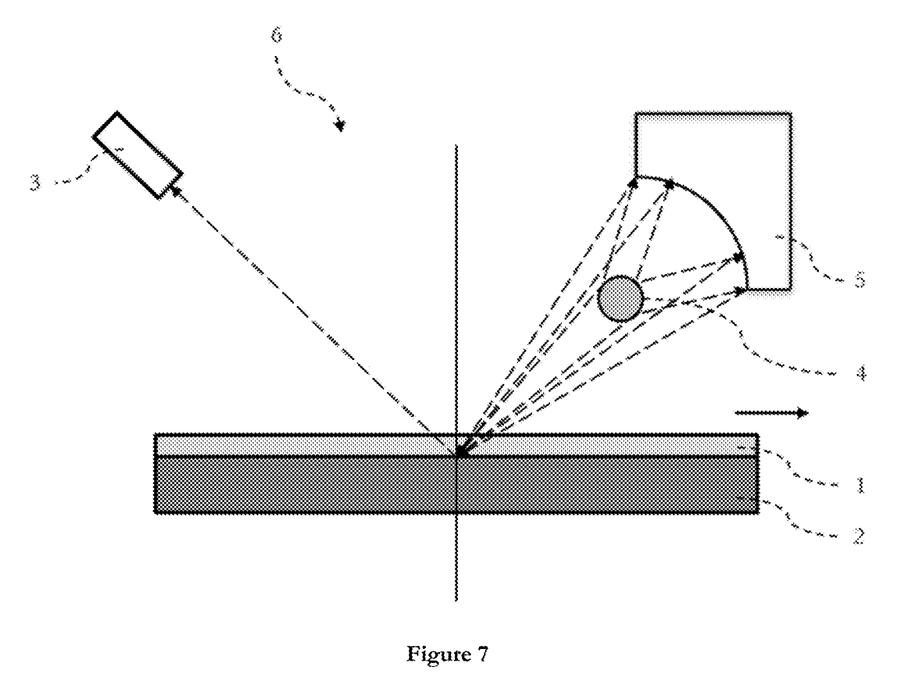
FIG. 7 is a schematic representation of a second embodiment of a measuring equipment.

Advantageously, as illustrated in FIG. 7, said equipment comprises a convex reflection mean 5 being positioned to reflect the light from the polychromatic light emitter 4 onto said substrate, said convex reflection mean 5 and the hyperspectral camera 3 being set-up in specular reflection towards said substrate. Such a device permits to concentrate the lighting intensity on an area, thus enabling a better and more precise measurement.

The reflecting device 5 is preferentially a convex mirror which permits to focus the beams on a small portion of the substrate length but on the whole substrate width. This reflective device is oriented in order to form an angle comprised between 20 and 80°, preferentially between 35 and 55°, between the reflected beam and the substrate plan. Said angle is preferably of 45°.

What is claimed is:

1. A process for mapping a degree of crystallinity of a polymer coating of a moving metallic substrate, the process comprising the following steps:
    a) lighting a transversal area of the polymer coating encompassing a full width with a polychromatic light including wavelengths in the infrared domain;
    b) measuring with at least one hyperspectral camera:
        a light intensity $S\_(impacted,\lambda\alpha)$ at a predetermined wavelength $\lambda\alpha$ impacted by the degree of crystallinity of the coating in the infrared domain and
        a light intensity $S\_(stable,\lambda\beta)$ at a predetermined wavelength $\lambda\beta$ not impacted by the degree of crystallinity of the coating in the infrared domain;
    of at least two light beams B1, B2 from the polychromatic light after reflection on the moving metallic substrate at two different locations L1, L2 within the transversal area;
    c) determining at least an impacted absorbance Aimp, using the light intensity $S\_(impacted,\lambda\alpha)$ at the predetermined wavelength $\lambda\alpha$ impacted by the degree of crystallinity for each beam B1, B2;
    d) determining at least a stable absorbance Asta, using the light intensity $S\_(stable,\lambda\beta)$ at the predetermined wavelength $\lambda\beta$ not impacted by the degree of crystallinity for each beam B1, B2;
    e) determining, for each beam B1, B2, a ratio, R, equal to Aimp/Asta
    f) converting each ratio R to a determined degree of crystallinity;
    g) mapping the determined degree of crystallinity of the polymer coating in the transversal area using the degree of crystallinity and the locations (L1, L2).

2. The process as recited in claim 1 wherein the method is repeated regularly so as to cover the full coating surface of said substrate.

3. The process as recited in claim 1 wherein said polymer coating is made of polyethylene terephthalate.

4. The process as recited in claim 1 wherein said metallic substrate is made of steel.

5. The process as recited in claim 1 wherein $\lambda\alpha$ is between 8 and 12 micrometers.

6. The process as recited in claim 5 wherein $\lambda\alpha$ is between 10.3 and 10.7 micrometers.

7. The process as recited in claim 1 wherein step b) is performed on at least 30 locations including locations L1, L2 within the transversal area.

8. The process as recited in claim 1 wherein the ratio R is converted to a degree of crystallinity using a predetermined relationship.

9. The process as recited in claim 1 wherein the hyperspectral camera is oriented to create an angle between 30° and 60° with the metallic substrate.

10. The process as recited in claim 1 wherein the degree of crystallinity of the polymer coating of the moving metallic substrate is mapped without degrading the polymer coating.

11. A mapped polymer coating of a moving metallic substrate mapped according to the process as recited in claim 1, the polymer coating having no degradation due to the process.

12. The process as recited in claim 1, wherein step (a) is performed with at least one polychromatic light emitter, and wherein said moving metallic substrate is moved with a conveyor.

13. The process as recited in claim 1, wherein step (f) is performed by using abacus.

14. The process as recited in claim 1, wherein the determined degree of crystallinity is not influenced by the operating conditions, and the operating conditions include chattering of the said moving metallic substrate and humidity.

15. The process as recited in claim 1 wherein $\lambda\beta$ is between 9.5 and 9.7 micrometers.

16. The process as recited in claim 1 wherein $\lambda\alpha$ is between 8 and 12 micrometers, and $\lambda\beta$ is between 9.5 and 9.7 micrometers.

17. Equipment for online measurement of crystallinity degree of a polymer coating on a moving metallic substrate, comprising:
    at least one hyperspectral camera;
    at least one polychromatic light emitter; and a substrate conveyor, the polychromatic light emitter and the hyperspectral camera being set-up in specular reflection towards the metallic substrate;

the at least one polychromatic light emitter arranged to light a transversal area of the polymer coating encompassing a full width with a polychromatic light including wavelengths in the infrared domain on the moving metallic substrate;

the at least one hyperspectral camera configured to measure:

a light intensity $S\_(impacted, \lambda \alpha)$ at a predetermined wavelength $\lambda \alpha$ impacted by the degree of crystallinity of the coating in the infrared domain and a light intensity $S\_(stable, \lambda \beta)$ at a predetermined wavelength $\lambda \beta$ not impacted by the degree of crystallinity of the coating in the infrared domain, of at least two light beams B1, B2 from the polychromatic light after reflection on the moving metallic substrate at two different locations L1, L2 within the transversal area; the substrate conveyor configured to move the metallic substrate.

18. The equipment as recited in claim 17 wherein the polychromatic light emitter is an infrared lighting source.

19. The equipment as recited in claim 17 wherein the polychromatic light emitter is made of at least a metal or ceramic.

20. The equipment as recited in claim 17 further comprising a convex reflector being positioned to reflect light from the polychromatic light emitter onto the substrate, the convex reflector and the hyperspectral camera being set-up in specular reflection towards the substrate.

21. The equipment as recited in claim 17, wherein $\lambda \alpha$ is between 8 and 12 micrometers.

22. The equipment as recited in claim 17, wherein $\lambda \beta$ is between 9.5 and 9.7 micrometers.

23. The equipment as recited in claim 17, wherein $\lambda \alpha$ is between 8 and 12 micrometers, and $\lambda \beta$ is between 9.5 and 9.7 micrometers.

* * * * *